United States Patent
Ye et al.

(10) Patent No.: US 12,443,783 B2
(45) Date of Patent: Oct. 14, 2025

(54) LOGIC CIRCUIT DESIGN METHOD

(71) Applicants: HANGZHOU WEIMING XINKE TECHNOLOGY CO., LTD, Zhejiang (CN); ADVANCED INSTITUTE OF INFORMATION TECHNOLOGY (AIIT), PEKING UNIVERSITY, Zhejiang (CN)

(72) Inventors: Le Ye, Zhejiang (CN); Zhixuan Wang, Zhejiang (CN); Qianqian Huang, Zhejiang (CN); Yangyuan Wang, Zhejiang (CN); Ru Huang, Zhejiang (CN)

(73) Assignees: HANGZHOU WEIMING XINKE TECHNOLOGY CO., LTD, Zhejiang (CN); ADVANCED INSTITUTE OF INFORMATION TECHNOLOGY (AIIT), PEKING UNIVERSITY, Zhejiang (CN)

( * ) Notice: Subject to any disclaimer, the term of this patent is extended or adjusted under 35 U.S.C. 154(b) by 706 days.

(21) Appl. No.: 17/786,993

(22) PCT Filed: Dec. 9, 2020

(86) PCT No.: PCT/CN2020/135034
§ 371 (c)(1),
(2) Date: Jun. 17, 2022

(87) PCT Pub. No.: WO2021/121107
PCT Pub. Date: Jun. 24, 2021

(65) Prior Publication Data
US 2023/0030944 A1    Feb. 2, 2023

(30) Foreign Application Priority Data
Dec. 17, 2019    (CN) .......................... 201911305046.3

(51) Int. Cl.
*G06F 30/398* (2020.01)
*G06F 119/06* (2020.01)

(52) U.S. Cl.
CPC ........ *G06F 30/398* (2020.01); *G06F 2119/06* (2020.01)

(58) Field of Classification Search
CPC .......... G06F 1/04; G06F 1/10; G06F 2119/06; G06F 2119/18; G06F 30/327;
(Continued)

(56) References Cited

U.S. PATENT DOCUMENTS

2017/0099011 A1* 4/2017 Freeman ................. H02M 7/06
2017/0117885 A1* 4/2017 Morris .................... H03K 3/012
(Continued)

FOREIGN PATENT DOCUMENTS

| CN | 110379449 A | 10/2019 |
| CN | 110557116 A | 12/2019 |
| CN | 111130529 A | 5/2020 |

OTHER PUBLICATIONS

Wang, Zhixuan et al. "Ultra-Low Power Hybrid TFET-MOSFET Topologies for Standard Logic Cells with Improved Comprehensive Performance" *2019 IEEE International Symposium on Circuits and Systems (ISCAS)*, May 1, 2019 (May 1, 2019), ISSN: 2158-1525, p. 2, right-hand column, paragraph 3 to p. 4, left-hand column, paragraph 1, figures 6-7.

*Primary Examiner* — Binh C Tat
(74) *Attorney, Agent, or Firm* — MUNCY, GEISSLER, OLDS & LOWE, P.C.

(57) ABSTRACT

Disclosed in the present application are a logic circuit design method and apparatus, and a storage medium. The method comprises: designing and generating an initial MOSFET-TFET hybrid logic circuit, the MOSFET-TFET hybrid logic circuit comprising several logic gates; in the series branch of the initial MOSFET-TFET hybrid logic circuit, replacing a
(Continued)

first type of TFET with a MOSFET; the first type of TFET being directly grounded or connected to a power supply and not directly connected to the output ends of the logic gates. The logic circuit design method of the present application overcomes the defect of excessive current attenuation caused by the TFET in the series branch by replacing the first type of TFET in the series branch of the initial logic circuit with a MOSFET. The first type of TFET is a TFET that is directly grounded or connected to a power supply and not directly connected to the output ends of the logic gates.

9 Claims, 3 Drawing Sheets

(58) Field of Classification Search
CPC ............... G06F 30/39; G06F 30/398; H01L 2924/13091; H01L 2924/14; H01L 2224/80896; H01L 2924/13067; H01L 21/02565; H01L 24/20; H01L 2924/14511; H01L 23/5386; H01L 21/76898; H01L 2224/73265; H01L 23/5286; H01L 23/5384
USPC ................................................ 716/100–106
See application file for complete search history.

(56) References Cited

U.S. PATENT DOCUMENTS

| | | |
|---|---|---|
| 2017/0170196 A1 | 6/2017 | Anderson et al. |
| 2021/0203325 A1* | 7/2021 | Manipatruni ...... H03K 19/0008 |

* cited by examiner

LOGIC CIRCUIT DESIGN METHOD

TECHNICAL FIELD

The present application relates to the technical field of integrated circuits, and specifically relates to a method for designing a logic circuit.

BACKGROUND

Over the past several decades, with the continuous reduction of the size of semiconductor devices, performances of integrated circuit chips have continued to improve, but the power consumption of system has also gradually increased. This problem has slowed down the further reduction of device size. Since a sub-threshold slope has a theoretical limit value of 60 mV/dec at room temperature, it is difficult for traditional MOSFET devices to reduce power consumption by continuously lowering an operating voltage $V_{DD}$. A MOSFET is a metal-oxide semiconductor field-effect transistor, which is referred to as MOSFET for short. In order to adapt to the future development trend of integrated circuits, the research on new ultra-low power consumption devices has received widespread attention. A tunneling field-effect transistor (TFET) uses a band-band tunneling width between a gate-controlled source region and the channel to control the tunneling of electrons from a valence band of the source terminal to a conduction band of the channel (or the tunneling of electrons from a valence band of the channel to a conduction band of the source terminal) to form a tunneling current. Theoretically, it can achieve a sub-threshold slope below 60 mV/dec at room temperature, and has an ultra-low leakage current. Especially, silicon-based TFETs can achieve an off-state leakage current that is about two orders of magnitude smaller than conventional MOSFETs.

However, the nonlinear turn-on characteristic of silicon-based TFETs leads to serious attenuation of the current when they are connected in series. Once TFET devices are used in standard logic unit circuits (such as multi-input NAND gates, NOR gates, etc.), the too small current in the series branch will severely degrade the performance, noise margin and the like of the logic circuits. Therefore, in order to take advantage of the ultra-steep sub-threshold slope and ultra-low off-state current characteristic of TFETs to reduce the power consumption of chip integrated circuits, it is necessary to overcome the defect of excessive attenuation of the current when TFETs are connected in series.

SUMMARY

An object of the present application is to provide a method for designing a logic circuit. In order to enable a basic understanding of some aspects of the disclosed embodiments, a brief summary is given below. This summary is not intended to be an extensive comment, nor is it intended to identify key/critical components or define the scope of protection of these embodiments. Its sole purpose is to present some concepts in a simple form as a prelude to the following detailed description.

According to an aspect of the embodiments of the present application, a method for designing a logic circuit is provided, which includes:
designing and generating an initial MOSFET-TFET hybrid logic circuit, in which the MOSFET-TFET hybrid logic circuit includes several logic gates; and
replacing a first type of TFET with a MOSFET in a series branch of the initial MOSFET-TFET hybrid logic circuit, in which the first type of TFET is directly connected to the ground or to a power supply and is not directly connected to output terminals of the logic gates.

Further, the method also includes:
replacing at least one of the remaining TFETs in the series branch after the first type of TFET is replaced with the MOSFET with a MOSFET.

Further, the method also includes:
adjusting the logic circuit after the first type of TFET is replaced with the MOSFET to a static standby state;
adjusting a first-level logic gate in the logic circuit in the static standby state to a preset logic input state;
acquiring static input bias state information of all the logic gates;
determining a first type of logic gate according to the static input bias state information, in which the first type of logic gate is a logic gate whose leakage state is determined by the MOSFET; and
exchanging correspondingly connected output terminals of at least two input terminals of the first type of logic gate, in which the correspondingly connected output terminal is an output terminal in an upper-level logic gate that is correspondingly connected with the input terminal.

Further, the logic gates include a NAND gate, a NOR gate, an XOR gate, an XNOR gate, and combinational logic gate circuits based on static complementary logic and having series branches.

Further, the MOSFET includes a planar MOSFET, a fin field effect transistor, a nanowire field effect transistor, a nanosheet field effect transistor and a negative capacitance transistor.

Further, the TFET includes a planar structure TFET, a fin structure TFET and a nanowire structure TFET.

According to another aspect of the embodiments of the present application, a device for designing a logic circuit is provided, which includes:
a design module, which is configured to design and generate an initial MOSFET-TFET hybrid logic circuit, in which the MOSFET-TFET hybrid logic circuit includes several logic gates; and
a replacement module, which is configured to replace a first type of TFET with a MOSFET in a series branch of the initial MOSFET-TFET hybrid logic circuit, in which the first type of TFET is directly connected to the ground or to a power supply and is not directly connected to output terminals of the logic gates.

Further, the replacement module is further configured to replace at least one of the remaining TFETs in the series branch after the first type of TFET is replaced with the MOSFET with a MOSFET.

Further, the device also includes:
a first adjustment module, which is configured to adjust the logic circuit after the first type of TFET is replaced with the MOSFET to a static standby state;
a second adjustment module, which is configured to adjust a first-level logic gate in the logic circuit in the static standby state to a preset logic input state;
an acquisition module, which is configured to acquire static input bias state information of all the logic gates;
a determination module, which is configured to determine a first type of logic gate according to the static input bias state information, in which the first type of logic gate is a logic gate whose leakage state is determined by the MOSFET; and an exchange module, which is configured to exchange correspondingly connected output terminals of at least two input terminals of the first type of logic gate, in which the correspondingly connected output terminal is an output terminal in an upper-level logic gate that is correspondingly connected with the input terminal.

According to further another aspect of the embodiments of the present application, a non-transitory computer-readable storage medium is provided, on which a computer program is stored; the program is executed by a processor to implement the method for designing a logic circuit as described.

The technical solution provided by one aspect of the embodiments of the present application may have the following advantageous effects.

The method for designing a logic circuit provided by the embodiments of the present application overcomes the defect of excessive attenuation of the current caused by the TFET in the series branch by replacing the first type of TFET in the series branch of the initial logic circuit with a MOSFET, in which the first type of TFET is a TFET that is directly connected to the ground or a power supply and is not directly connected to the output terminals of the logic gates.

Other features and advantages of the present application will be set forth in the following description. They will partly become apparent from the description, or may be partly inferred or undoubtedly determined from the description, or may be learned by carrying out embodiments of the present application. The objects and other advantages of the present application can be realized and obtained through the structures particularly pointed out in the written description, claims and drawings.

BRIEF DESCRIPTION OF THE DRAWINGS

In order to illustrate the embodiments of the present application or the technical solutions in the prior art more clearly, the accompanying drawings that are required to be used in describing the embodiments or the prior art will be introduced briefly in the following. Obviously, the drawings in the following description only illustrate some embodiments of the present application. For those skilled in the art, other drawings can also be obtained according to these drawings without creative efforts.

DETAILED DESCRIPTION

In order to make the objects, technical solutions and advantages of the present application clearer, the present application will be further described below with reference to the accompanying drawings and specific embodiments. It should be understood that the specific embodiments described herein are only used to explain the present application, instead of limiting the present application. Based on the embodiments in the present application, all other embodiments obtained by those skilled in the art without creative efforts shall fall within the scope of protection of the present application.

It will be understood by those skilled in the art that unless otherwise defined, all terms (including technical terms and scientific terms) used herein have the same meanings as those commonly understood by those skilled in the art to which the present application belongs. It should also be understood that terms such as those defined in a general dictionary should be understood to have meanings consistent with their meanings in the context of the prior art, and that unless specifically defined herein, they should not be interpreted in idealistic or overly formal meaning.

Figure 1:
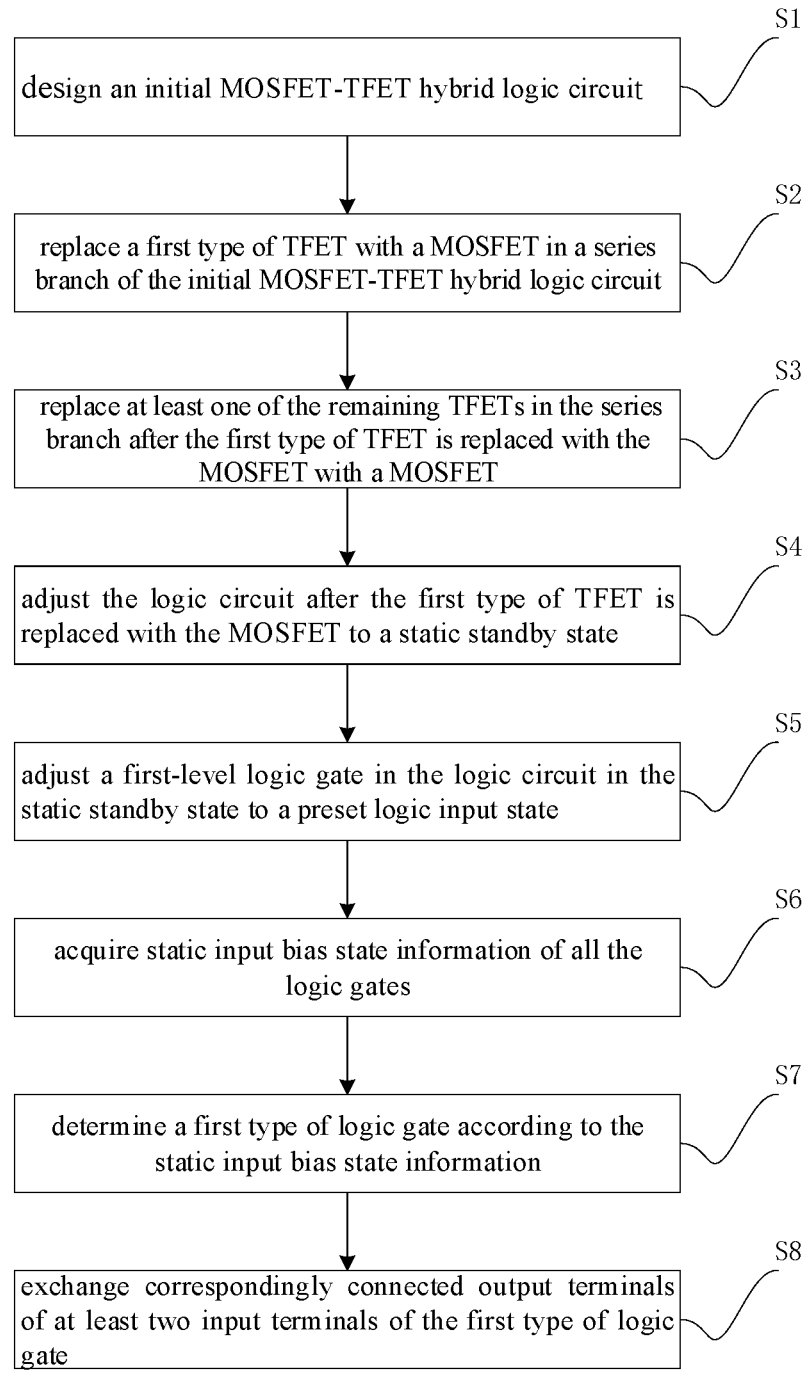
FIG. 1 shows a flowchart of a method for designing a logic circuit according to an embodiment of the present application.

As shown in FIG. 1, an embodiment of the present application provides a method for designing a logic circuit, which includes the following steps S1 and S2.

S1: designing and generating an initial MOSFET-TFET hybrid logic circuit, in which the MOSFET-TFET hybrid logic circuit includes several logic gates.

For example, structural design and functional design are conducted on circuit design software according to design requirements. The structural design is to describe a circuit as several typical logic devices connected to each other, in which the logic devices include several logic gates. The functional design is to define input and output ports and relationships between the input and output ports by writing a script language, so as to realize corresponding functions of the circuit. It should be noted that the structural designs completed according to different design requirements may be different.

S2: replacing a first type of TFET with a MOSFET in a series branch of the initial MOSFET-TFET hybrid logic circuit, in which the first type of TFET is directly connected to the ground or to a power supply and is not directly connected to output terminals of the logic gates.

By replacing the first type of TFET in the series branch with the MOSFET, the drawback of excessive attenuation of the current caused by the TFET in the series branch is overcome.

In some embodiments, the method further includes:

S3: replacing at least one of the remaining TFETs in the series branch after the first type of TFET is replaced with the MOSFET with a MOSFET. By replacing the remaining TFETs in the series branch with MOSFETs, the drawback of excessive attenuation of the current caused by the TFET in the series branch is overcome.

Further, in order to overcome the problem of excessive leakage caused by the MOSFET, in some embodiments, the method further includes:

S4: adjusting the logic circuit after the first type of TFET is replaced with the MOSFET to a static standby state;

S5: adjusting a first-level logic gate in the logic circuit in the static standby state to a preset logic input state;

S6: acquiring static input bias state information of all the logic gates;

in which the static input bias state information of all the logic gates is, for example, obtained through logical reasoning calculation (for example, it can be realized by electronic design automation (EDA) tools);

S7: determining a first type of logic gate according to the static input bias state information, in which the first type of logic gate is a logic gate whose leakage state is determined by the MOSFET; and S8: exchanging correspondingly connected output terminals of at least two input terminals of the first type of logic gate, in which the correspondingly connected output terminal is an output terminal in an upper-level logic gate that is correspondingly connected with the input terminal.

After the above steps S4-S8 are executed, a leakage path of the logic gate in a state in which the leakage is mainly caused by the MOSFET is cut off, so that the leakage current of the series branch is determined by the TFET. After the TFET is turned off, the leakage of the entire gate is pinched, so that the leakage of these logic gates depends on an ultra-low TFET off-state leakage, thereby greatly reducing the leakage current amount and thus making the entire logic circuit have ultra-low static power consumption.

In some embodiments, the logic gates include a NAND gate, a NOR gate, an XOR gate, an XNOR gate, and combinational logic gate circuits based on static complementary logic and having series branches.

In some embodiments, the MOSFET includes a planar MOSFET, a fin field effect transistor, a nanowire field effect transistor, a nanosheet field effect transistor and a negative capacitance transistor.

In some embodiments, the TFET includes a planar structure TFET, a fin structure TFET and a nanowire structure TFET.

This embodiment also provides a device for designing a logic circuit, which includes:

a design module, which is configured to design and generate an initial MOSFET-TFET hybrid logic circuit, in which the MOSFET-TFET hybrid logic circuit includes several logic gates; and a replacement module, which is configured to replace a first type of TFET with a MOSFET in a series branch of the initial MOSFET-TFET hybrid logic circuit, in which the first type of TFET is directly connected to the ground or to a power supply and is not directly connected to output terminals of the logic gates.

In some embodiments, the replacement module is further configured to replace at least one of the remaining TFETs in the series branch after the first type of TFET is replaced with the MOSFET with a MOSFET.

In some embodiments, the device further includes:

a first adjustment module, which is configured to adjust the logic circuit after the first type of TFET is replaced with the MOSFET to a static standby state;

a second adjustment module, which is configured to adjust a first-level logic gate in the logic circuit in the static standby state to a preset logic input state;

an acquisition module, which is configured to acquire static input bias state information of all the logic gates;

a determination module, which is configured to determine a first type of logic gate according to the static input bias state information, in which the first type of logic gate is a logic gate whose leakage state is determined by the MOSFET; and an exchange module, which is configured to exchange correspondingly connected output terminals of at least two input terminals of the first type of logic gate, in which the correspondingly connected output terminal is an output terminal in an upper-level logic gate that is correspondingly connected with the input terminal.

This embodiment also provides a non-transitory computer-readable storage medium, on which a computer program is stored; the program is executed by a processor to implement the method for designing a logic circuit as described above.

This embodiment also provides a semiconductor device, which includes a logic circuit obtained through the method for designing a logic circuit as described above, in which the semiconductor device is made of an elemental semiconductor material from group VI, or a binary or ternary compound semiconductor material from any of groups II-VI, groups III-V or groups IV-IV.

Figure 2:
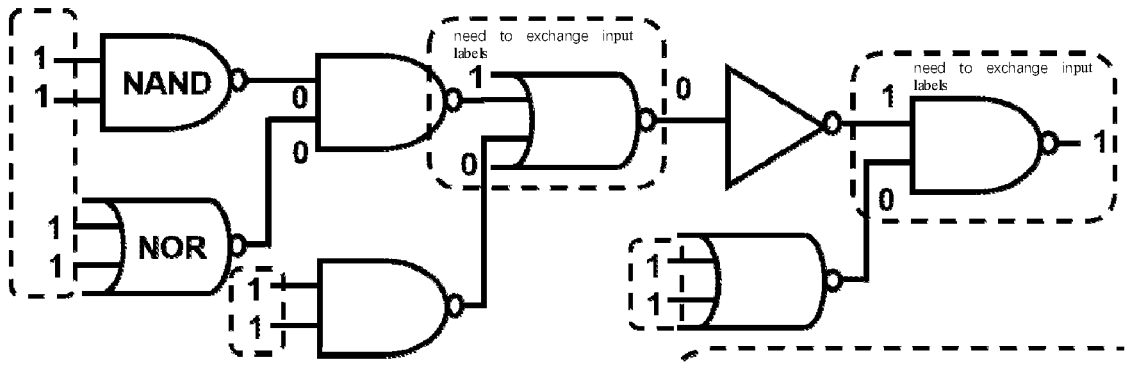
FIG. 2 shows a circuit diagram based on a hybrid MOSFET-TFET logic gate.
Figure 3:
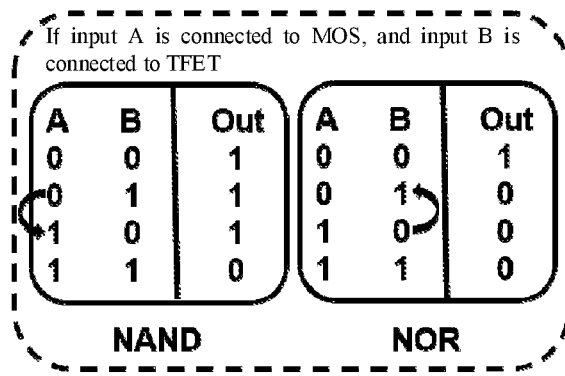
FIG. 3 shows a truth table comparison diagram of a NAND gate and a NOR gate in the circuit shown in FIG. 2.

In another embodiment, as shown in FIG. 2, in a circuit based on a hybrid MOSFET-TFET logic gate, for the hybrid MOSFET-TFET logic gate, there exists a larger leakage current caused by a series branch MOSFET under certain static input bias conditions (IN A and IN B). For example, as shown in FIG. 3, let the input A (IN A) of the logic gate be connected to the MOSFET, and the input B (IN B) be connected to the TFET; for NAND, when IN A=0 and IN B=1, the static leakage of the logic gate depends on the MOSFET; for NOR, when IN A=1 and IN B=0, the static leakage of the logic gate also depends on the MOSFET; when the logic gates of the hybrid structure form the logic circuit as shown in FIG. 2, some logic gates may be in a large leakage state due to the input conditions (IN A and IN B) exemplified above, and the leakage current level is comparable to an off-state current of the MOSFET.

Figure 4:
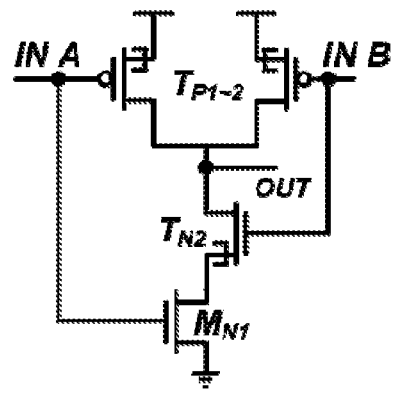
FIG. 4 shows a circuit diagram of a two-input NAND gate.
Figure 5:
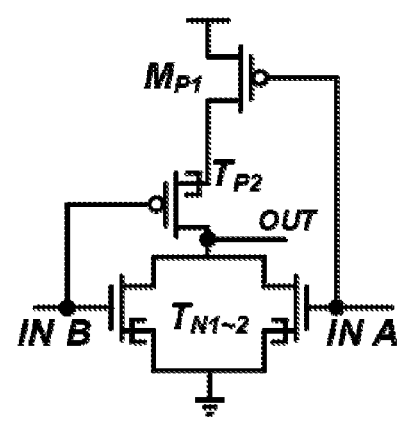
FIG. 5 shows a circuit diagram of a two-input NOR gate.

As shown in FIGS. 4 and 5, the NAND gate and the NOR gate in the circuit of the hybrid MOSFET-TFET logic gate are the two-input NAND gate (NAND) and NOR gate (NOR) respectively.

(1) The two parallel branches of NAND use TFETs: $T_{P1}$ and $T_{P2}$; a drain terminal of TFET $T_{N2}$ in the series branch is connected to an output node OUT (i.e., an output terminal of the logic gate), and a source terminal of MOSFET $M_{N1}$ is connected to a ground node (i.e., directly grounded). Therefore, there is no TFET working in the nonlinear turn-on region on the series branch, so there will be no rapid attenuation of the current in the series branch caused by its nonlinear turn-on characteristic.

(2) The two parallel branches of NOR use TFETs: $T_{N1}$ and $T_{N2}$; a drain terminal of TFET $T_{P2}$ on the series branch is connected to the output node OUT, and a source terminal of MOSFET $M_{P1}$ is connected to a power supply node (i.e., directly connected to the power supply). Therefore, there is no TFET working in the nonlinear turn-on region on the series branch, so there will be no rapid attenuation of the current in the series branch caused by its nonlinear turn-on characteristic.

The method for designing the logic circuit includes:

(1) for the logic circuit after the first type of TFET is replaced with the MOSFET, when the logic circuit is in a static standby state, adjusting the first-level logic gate in the logic network chain to a preset logic input state.

For example, the inputs of the first-level logic gates of the logic network chain (i.e., the logic circuit) in FIG. 2 are all set to logic 1. The first-level logic gates refer to logic gates directly connected to the circuit input.

(2) acquiring static input bias state information of all the logic gates.

For example, the static input bias state information of all the logic gates is obtained through logical reasoning calculation (for example, it can be realized by electronic design automation (EDA) tools).

(3) searching for a first type of logic gate and a second type of logic gate in the logic network chain.

In this embodiment, the first type of logic gate is a NAND gate with a first input state (IN A=0, IN B=1), and the second type of logic gate is a NOR gate with a second input state (IN A=1, IN B=0).

(4) exchanging the IN A and IN B labels of the first type of logic gate and the second type of logic gate (that is, exchanging IN A and IN B with the corresponding output terminals of the upper-level logic gate), and exchanging the two input terminals of the first type of logic gate and the second type of logic gate.

As shown in FIG. 3, for the NAND, the input condition after the exchange is IN A=1, IN B=0; and for the NOR, the input condition after the exchange is IN A=0, IN B=1; the leakage conditions of these logic gate circuits are no longer determined by the MOSFET, but by the TFET.

Since the leakage current amount of the TFET is much lower than that of the MOSFET, if the MOSFET is turned off and the TFET is turned on in the series branch of the logic gate circuit under a certain input condition, the leakage current of the entire logic gate is equal to the leakage current of the MOSFET, and after the label exchange, the TFET is turned off and the MOSFET is turned on; finally, the leakage current of the series branch is determined by the TFET. After the TFET is turned off, the leakage of the entire gate is pinched, so the entire logic network chain has ultra-low static power consumption.

In the hybrid MOSFET-TFET logic gate in this embodiment, on the basis of the traditional logic gate topology, the TFET near the ground node and the power supply node in the series branch is replaced with MOSFET. On one hand, the serious attenuation phenomenon of the current in the series branch caused by the nonlinear turn-on characteristics of the TFET at the above node is eliminated, and on the other hand, the MOSFET with a higher on-state current increases the current in the series branch. In addition, in this embodiment, a fixed input of the first stage of the circuit is set when the circuit is in a static state, and then it is judged which internal logic gates are in a state in which the leakage is mainly caused by the MOSFET, and the leakage paths of these logic gates are cut off by exchanging the input labels of the logic gates, so that the leakage of these logic gates depends on the ultra-low TFET off-state leakage.

In some embodiments, TFETs are used in the parallel branch, MOSFETs are used near the ground node and the power supply node in the series branch, and TFETs are used in the series node near the output node.

In some embodiments, the logic gates include multi-input NAND gates, NOR gates, XOR gates, XNOR gates, and complex logic gates based on static complementary logic and having series branches.

In some embodiments, the MOSFET may be a planar MOSFET, a FinFET, a nanowire, a nanosheet, a NCFET, etc.; and the TFET can adopt various structures such as a planar structure, a fin structure, and a nanowire structure.

It should be noted:

The algorithms and displays provided herein are not inherently related to any particular computer, virtual device, or other devices. Various general-purpose devices may also be used with the teachings based on the present application. The structure required for constructing such a device is obvious from the above description. Furthermore, the present application is not directed to any particular programming language. It should be understood that the content of the present application described herein can be implemented using various programming languages and that the above description of specific languages is intended to disclose the best embodiments of the present application.

In the description provided herein, a lot of specific details are set forth. However, it can be understood that the embodiments of the present application may be practiced without these specific details. In some examples, well-known methods, structures and techniques are not shown in detail in order not to obscure an understanding of the description.

Similarly, it should be understood that in order to simply the present disclosure and help understand one or more of the various inventive aspects, in the above description of exemplary embodiments of the present application, various features of the present application are sometimes grouped together into a single embodiment, figure, or its description. However, the method of the present disclosure should not be interpreted as reflecting the intention that the claimed application requires more features than those expressly recited in each claim. More precisely, as reflected by the following claims, the inventive aspects lie in less than all features of a single embodiment disclosed above. Thus, the claims following the Detailed Description are hereby expressly incorporated into the Detailed Description, with each claim itself serving as a separate embodiment of the present application.

It can be understood by those skilled in the art that the modules in the device in the embodiment can be self-adaptively changed and arranged in one or more devices different from the embodiment. The modules or units or components in the embodiments may be combined into one module or unit or component, and they may also be divided into multiple sub-modules or sub-units or sub-components. Except that a least some of such features and/or processes or units are mutually exclusive, all features disclosed in the specification (including appended claims, abstract and drawings) can be used in any combination with any method or all processes or units of the device so disclosed. Each feature disclosed in the specification (including appended claims, abstract and drawings) may be replaced with alternative features providing the same, equivalent or similar objects, unless expressly stated otherwise.

Furthermore, it can be understood by those skilled in the art that although some of the embodiments described herein include some features included in other embodiments instead of other features, a combination of features from different embodiments is intended to be within the scope of the present application and form different embodiments. For example, in the appended claims, any of the claimed embodiments may be used in any combination.

Various component embodiments of the present application may be implemented in hardware, or in software modules running on one or more processors, or in a combination of hardware and software. It should be understood by those skilled in the art that a microprocessor or a digital signal processor (DSP) may be used in practice to implement some or all functions of some or all components in a device for creating a virtual machine according to the embodiments of the present application. The present application can also be implemented as an apparatus or device program (e.g., a computer program and a computer program product) for performing part or all of the methods described herein. Such a program for implementing the present application may be stored on a computer-readable medium, or may be in the form of one or more signals. Such signals may be downloaded from Internet websites, or provided on carrier signals, or provided in any other form.

It should be noted that the above embodiments illustrate the present application rather than limiting it, and that alternative embodiments may be designed by those skilled in the art without departing from the scope of the appended claims. In the claims, any reference sign placed between parentheses shall not be construed as limiting the claim. The word "include" does not exclude the existence of elements or steps not listed in a claim. The word "a" or "one" preceding an element does not exclude the existence of a plurality of such elements. The present application can be implemented by means of hardware including several different elements and by means of a suitably programmed computer. In a unit claim enumerating several devices, several of these devices may be embodied by the same one hardware item. The use of words "first", "second", "third" and the like do not denote any order. These words can be interpreted as names.

The above embodiments only represent the embodiments of the present application, and a description thereof is relatively specific and detailed, but it should not be construed as limiting the scope of the present application. It should be pointed out that for those skilled in the art, several modifications and improvements can also be made without departing from the concept of the present application, and these modifications and improvements all fall within the scope of protection of the present application. Therefore, the scope of protection of the present application should be accorded with the appended claims.

The invention claimed is:

1. A method for designing a logic circuit, comprising:
designing and generating an initial MOSFET-TFET hybrid logic circuit, wherein the MOSFET-TFET hybrid logic circuit comprises several logic gates;
replacing a first type of TFET with a MOSFET in a series branch of the initial MOSFET-TFET hybrid logic circuit, wherein the first type of TFET is directly connected to the ground or to a power supply and is not directly connected to output terminals of the logic gates;
adjusting the logic circuit after the first type of TFET is replaced with the MOSFET to a static standby state;
adjusting a first-level logic gate in the logic circuit in the static standby state to a preset logic input state;
acquiring static input bias state information of all the logic gates;
determining a first type of logic gate according to the static input bias state information, wherein the first type of logic gate is a logic gate whose leakage state is determined by the MOSFET, and wherein the first type of logic gate comprises a NAND gate with a first input state of IN A=0 and IN B=1 or a NOR gate with a second input state of IN A=1 and IN B=0 during the static standby state; and
exchanging correspondingly connected output terminals of at least two input terminals of the first type of logic gate, wherein the correspondingly connected output terminal is an output terminal in an upper-level logic gate that is correspondingly connected with the input terminal.

2. The method according to claim 1, further comprising:
replacing at least one of remaining TFETs in the series branch after the first type of TFET is replaced with the MOSFET with a MOSFET.

3. The method according to claim 1, wherein the logic gates comprise a NAND gate, a NOR gate, an XOR gate, an XNOR gate, and combinational logic gate circuits based on static complementary logic and having series branches.

4. The method according to claim 1, wherein the MOSFET comprises a planar MOSFET, a fin field effect transistor, a nanowire field effect transistor, a nanosheet field effect transistor and a negative capacitance transistor.

5. The method according to claim 1, wherein the TFET comprises a planar structure TFET, a fin structure TFET and a nanowire structure TFET.

6. A device for designing a logic circuit, comprising:
a design module, which is configured to design and generate an initial MOSFET-TFET hybrid logic circuit, wherein the MOSFET-TFET hybrid logic circuit comprises several logic gates; and
a replacement module, which is configured to replace a first type of TFET with a MOSFET in a series branch of the initial MOSFET-TFET hybrid logic circuit, wherein the first type of TFET is directly connected to the ground or to a power supply and is not directly connected to output terminals of the logic gates,
wherein the logic circuit is adjusted after the first type of TFET is replaced with the MOSFET to a static standby state; a first-level logic gate in the logic circuit in the static standby state is adjusted to a preset logic input state; static input bias state information of all the logic gates is acquired; a first type of logic gate is determined according to the static input bias state information, wherein the first type of logic gate is a logic gate whose leakage state is determined by the MOSFET, and wherein the first type of logic gate comprises a NAND gate with a first input state of IN A=0 and IN B=1 or a NOR gate with a second input state of IN A=1 and IN B=0 during the static standby state; and correspondingly connected output terminals of at least two input terminals of the first type of logic gate are exchanged, wherein the correspondingly connected output terminal is an output terminal in an upper-level logic gate that is correspondingly connected with the input terminal.

7. The device according to claim 6, wherein the replacement module is further configured to replace at least one of the remaining TFETs in the series branch after the first type of TFET is replaced with the MOSFET with a MOSFET.

8. The device according to claim 6, further comprising:
a first adjustment module, which is configured to adjust the logic circuit after the first type of TFET is replaced with the MOSFET to a static standby state;
a second adjustment module, which is configured to adjust a first-level logic gate in the logic circuit in the static standby state to a preset logic input state;
an acquisition module, which is configured to acquire static input bias state information of all the logic gates;
a determination module, which is configured to determine a first type of logic gate according to the static input bias state information, wherein the first type of logic gate is a logic gate whose leakage state is determined by the MOSFET; and
an exchange module, which is configured to exchange correspondingly connected output terminals of at least two input terminals of the first type of logic gate, wherein the correspondingly connected output terminal is an output terminal in an upper-level logic gate that is correspondingly connected with the input terminal.

9. A non-transitory computer-readable storage medium, on which a computer program is stored, wherein the program is executed by a processor to implement the method for designing a logic circuit according to claim 1.

* * * * *